(12) United States Patent
Bangalore Sathyanarayana et al.

(10) Patent No.: US 11,831,674 B2
(45) Date of Patent: Nov. 28, 2023

(54) DETECTING MAN-IN-THE-MIDDLE ATTACKS IN MANAGEMENT COMPONENT TRANSPORT PROTOCOL NETWORK SERVER SYSTEMS

(71) Applicant: Cisco Technology, Inc., San Jose, CA (US)

(72) Inventors: Kiran Bangalore Sathyanarayana, Bangalore (IN); Vipin Nagar, Indore (IN)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 17/072,544

(22) Filed: Oct. 16, 2020

(65) Prior Publication Data
US 2022/0124118 A1    Apr. 21, 2022

(51) Int. Cl.
*G06F 21/00*        (2013.01)
*H04L 9/40*         (2022.01)

(52) U.S. Cl.
CPC ...... *H04L 63/1466* (2013.01); *H04L 63/0236* (2013.01); *H04L 63/1416* (2013.01); *H04L 63/1425* (2013.01); *H04L 63/20* (2013.01)

(58) Field of Classification Search
CPC ............ H04L 63/1466; H04L 63/0236; H04L 63/1416; H04L 63/1425; H04L 63/20; H04L 63/1408; H04W 12/61
See application file for complete search history.

(56) References Cited

U.S. PATENT DOCUMENTS

| | | | |
|---|---|---|---|
| 10,242,176 B1* | 3/2019 | Sathyanarayana | ...... G06F 13/36 |
| 2006/0146862 A1* | 7/2006 | Lee | ........................ H04W 76/12 |
| | | | 370/448 |
| 2010/0115592 A1* | 5/2010 | Belz | ................. H04N 21/43637 |
| | | | 726/5 |
| 2012/0331119 A1* | 12/2012 | Bose | ................... H04L 61/5014 |
| | | | 709/223 |
| 2014/0123278 A1 | 5/2014 | Thubert et al. | |

(Continued)

OTHER PUBLICATIONS

Parmar, Hiren and Gosai, Atul, "Analysis and Study of Network Security at Transport Layer," International Journal of Computer Applications (0975-8887), vol. 121—No. 13, Jul. 2015, downloaded at: https://www.researchgate.net/publication/281978834, 7 pages.

*Primary Examiner* — Michael M Lee
(74) *Attorney, Agent, or Firm* — Lee & Hayes, P.C.

(57) ABSTRACT

Techniques and mechanisms for verifying integrity of components within a management component transport protocol (MCTP) server system to detect man-in-the-middle (MITM) attacks and preventing data loss upon detection of MITM attacks. For example, a controller may perform an endpoint discovery process and authenticate endpoints within a rack server system. The controller may send requests to endpoints based on user actions and if no response is received from a particular endpoint, the controller may determine there is a MITM attack and block traffic to the particular endpoint. Additionally, the controller may periodically request measurements from endpoints that are related to the code and configuration area of the endpoints. If the received measurements from a particular endpoint do not match expected values, the controller may determine there is a MITM attack and block traffic to the particular endpoint.

15 Claims, 12 Drawing Sheets

(56) References Cited

U.S. PATENT DOCUMENTS

| | | | |
|---|---|---|---|
| 2014/0317409 A1* | 10/2014 | Bartok | H04L 63/20 |
| | | | 713/171 |
| 2014/0344925 A1 | 11/2014 | Muthiah | |
| 2016/0207323 A1* | 7/2016 | Ward | B41J 2/17543 |
| 2016/0308886 A1 | 10/2016 | Lee et al. | |
| 2016/0323318 A1* | 11/2016 | Terrill | H04L 63/1441 |
| 2017/0085413 A1* | 3/2017 | Cencini | G06F 1/189 |
| 2018/0288090 A1 | 10/2018 | Olarig et al. | |
| 2019/0220617 A1* | 7/2019 | Harriman | G06F 21/6218 |
| 2020/0137079 A1* | 4/2020 | Jreij | G06F 13/4282 |

* cited by examiner

| Offset | Field | Size (Bytes) | Value |
|---|---|---|---|
| 0 | SPDMVersion | 1 | V1.0 = 0x10 |
| 1 | RequestResponseCode | 1 | 0xE0 = GET_MEASUREMENTS |
| 2 | Param1 | 1 | Request attributes. See Table 23. |
| 3 | Param2 | 1 | Measurement operation. A value of 0x0 shall query the Responder for the total number of measurements available. A value of 0xFF shall request all measurements. A value between 0x1 and 0xFE inclusively shall request the mesurement at the index corresponding to that value. |
| 4 | Nonce | 32 | The Requester should choose a random value. This field is only present if a signature is required on the response. See Table 23. |

FIG. 2A

| Offset | Field | Size (Bytes) | Value |
|---|---|---|---|
| 0 | SPDMVersion | 1 | V1.0 = 0x10 |
| 1 | RequestResponseCode | 1 | 0x60 = Measurements |
| 2 | Param1 | 1 | When Param2 in the requested measurement operation is 0, this parameter shall return the total number of measurement indices on the device. Otherwise, this field is reserved. |
| 3 | Param2 | 1 | Reserved |
| 4 | NumberOfBlocks | 1 | Number of measurement blocks (N) in MeasurementRecord. This field shall reflect the number of measurement blocks in MeasurementRecord. If Param2 in the requested measurement operation is 0, this field shall be 0. |
| 5 | MeasurementRecordLength | 3 | Size of the MeasurementRecord field in bytes. If Param2 in the requested measurement operation is 0, this field shall be 0. |

FIG. 2B

| OFFSET | FIELD | SIZE (BYTES) | VALUE |
|---|---|---|---|
| 8 | MEASUREMENTRECORD | L=MEASUREMENTRECORDLENGTH | CONCATENATION OF ALL MEASUREMENT BLOCKS THAT CORRESPOND TO THE REQUESTED MEASUREMENT OPERATION. THE MEASUREMENT BLOCK STRUCTURE IS DEFINED IN MEASUREMENT BLOCK. |
| 8 + L | NONCE | 32 | THE RESPONDER SHOULD CHOOSE A RANDOM VALUE. |
| 40 + L | OPAQUELENGTH | 2 | SIZE OF THE OPAQUEDATA FIELD IN BYTES. THE VALUE SHALL NOT BE GREATER THAN 1024 BYTES. |
| 42 + L | OPAQUEDATA | OPAQUELENGTH | FREE-FORM FIELD, IF PRESENT. THE RESPONDER MAY INCLUDE RESPONDER-SPECIFIC INFORMATION AND/OR INFORMATION DEFINED BY ITS TRANSPORT. |
| 42 + L + OPAQUELENGTH | SIGNATURE | S | SIGNATURE OF THE GET_MEASUREMENTS REQUEST AND MEASUREMENTS RESPONSE MESSAGES, EXCLUDING THE SIGNATURE FIELD AND SIGNED USING THE DEVICE PRIVATE KEY (SLOT 0 LEAF CERTIFICATE PRIVATE KEY). THE RESPONDER SHALL USE THE ASYMMETRIC SIGNING ALGORITHM IT SELECTED DURING THE LAST ALGORITHMS RESPONSE MESSAGE TO THE REQUESTER AND S IS THE SIZE OF THAT ASYMMETRIC SIGNING ALGORITHM OUTPUT. |

FIG. 2C

| Command-ID = 0xEA | Request Bytes | Response Bytes |
|---|---|---|
| | Bytes [0:1] = B/D/F of the endpoint that needs to be blocked<br><br>Byte [2]: Action to be performed.<br>0x00 => Unblock the MCTP communication path<br>0x01 => Block the MCTP communication path | Byte [0]: Response Code.<br>0x00 => Success<br>0x01 => Wrong B/D/F value<br>0xFF => Failure due to unknown reason |

| COMMAND-ID = 0xEB | REQUEST BYTES | RESPONSE BYTES |
|---|---|---|
| | BYTES [0:1] = B/D/F OF THE ENDPOINT FOR WHICH STATUS NEEDS TO BE READ | BYTE [0]: RESPONSE CODE. 0x00 => SUCCESS 0x01 => WRONG B/D/F VALUE 0xFF => FAILURE DUE TO UNKNOWN REASON

BYTE [1]: STATUS OF THE MCTP COMMUNICATION PATH. 0x00 => PATH IS NOT BLOCKED 0x01 => PATH IS BLOCKED ANY OTHER VALUE IS INVALID |

FIG. 4B

DETECTING MAN-IN-THE-MIDDLE ATTACKS IN MANAGEMENT COMPONENT TRANSPORT PROTOCOL NETWORK SERVER SYSTEMS

TECHNICAL FIELD

The present disclosure relates generally to verifying integrity of components within a management component transport protocol (MCTP) server system to detect man-in-the-middle (MITM) attacks and preventing data loss upon detection of MITM attacks.

BACKGROUND

A C-series rack server system configured in accordance with the management component transport protocol (MCTP) contains multiple peripheral component interconnect express (PCIe) adapters and non-volatile memory express (NVMe) drives (referred to collectively herein as PCIe devices) to provide required network input/output (IO), graphics and storage functionalities. A baseboard management controller (BMC) present in the system manages the PCIe adapters. The management from the BMC may include thermal monitoring, configuration, firmware updates, etc. for the PCIe devices (hereafter referred to as endpoints interchangeably). The configuration includes defining the personality of the rack server system, e.g., creating virtual drives (VDs), formatting hard disk drives (HDDs), etc. A current industry standard is to use MCTP over PCIe vendor defined message (VDM) protocol as an out-of-band management communication between the BMC and the PCIe adapters/NVMe drives. MCTP is a transport protocol that is defined by distributed management task force (DMTF).

In a C-series rack server system, the BMC is a trusted device on the system that manages the configuration of the server. The BMC and the other PCIe devices present in the server form a MCTP network. On this MCTP network, the BMC is the bus owner that discovers all the devices and assigns unique endpoint-IDs to them. The BMC uses the assigned endpoint-IDs for further communication with the devices on the network according to the MCTP specification, e.g., DSP0236, version 1.1.0 provided by the DMTF. The assigned endpoint-ID from the BMC may be used to address point-to-point MCTP communication packets from the BMC. Any disruptions in an assigned endpoint-ID value will lose the MCTP communication between the BMC and the corresponding PCIe device.

The MCTP protocol defines that any device on the network may become the bus owner, e.g., the BMC, and claim control of the MCTP network by performing the endpoint discovery process and assigning unique endpoint-IDs. This can prevent the BMC from reaching the PCIe devices and presents at least two man-in-the-middle (MITM) attack scenarios.

A first example of an attack scenario may be referred to as a denial-of-service (DOS) attack. With such an attack, a rogue PCIe device/host operating system (OS) application may send MCTP endpoint discovery commands and become master of the MCTP network, e.g., the BMC. An example attack may include a rogue PCIe device/host OS application continually sending partial MCTP discovery commands using "route-by-id" MCTP packet types continually and thereby disrupt communication between the actual BMC and the PCIe device. Another example attack may include a rogue PCIe device/host OS application performing re-discovery and swapping the endpoint-ID settings between the PCIe devices present in the system. In this case, the BMC is still able to communicate, but will not get the expected responses and the system will not behave as expected.

A second example of an attack scenario may be referred to as a spoofing attack scenario. With such an attack, a rogue PCIe device/host OS application may act as the valid PCIe endpoint and receive all the configuration commands sent from the BMC to the actual corresponding PCIe device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates an example of a GET_MEASUREMENTS request message format, while FIGS. 2B and 2C illustrate a GET_MEASUREMENTS response message format for use in the rack server system of FIG. 1.

FIG. 4B illustrates an example of an IPMB response format to obtain the current status of the MCTP communication path for an endpoint in the rack server system of FIG. 1.

DESCRIPTION OF EXAMPLE EMBODIMENTS

Overview

Figure 1:
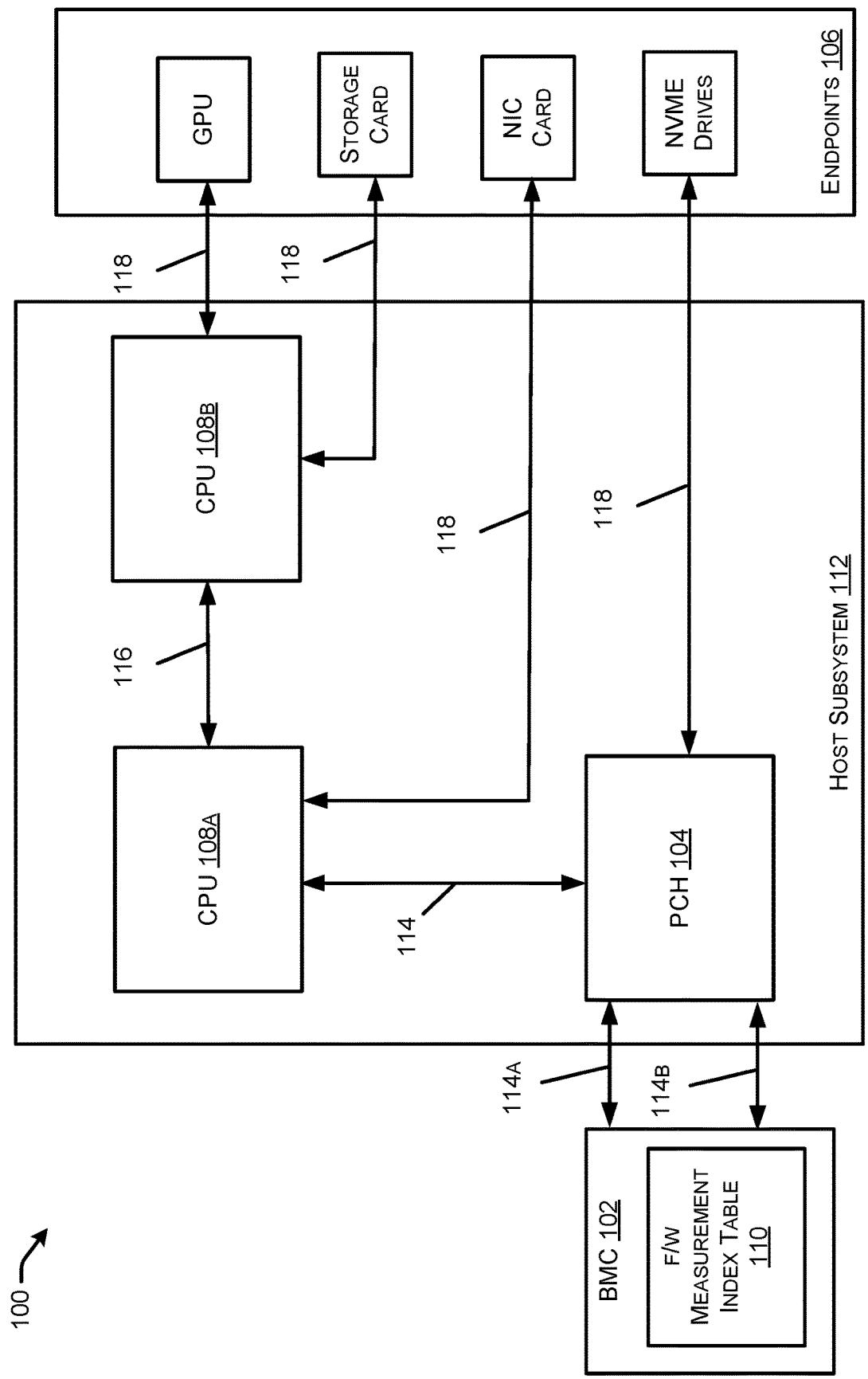
FIG. 1 schematically illustrates an example a rack server system in configured in accordance with a management component transport protocol (MCTP).

This disclosure describes techniques for verifying integrity of components within a management component transport protocol (MCTP) server system to detect man-in-the-middle (MITM) attacks and preventing data loss upon detection of MITM attacks. For example, a controller may perform an endpoint discovery process and authenticate endpoints within a rack server system. The controller may send requests to endpoints based on user actions and if no response is received from a particular endpoint, the controller may determine there is a MITM attack and block traffic to the particular endpoint. Additionally, the controller may periodically request measurements from endpoints that are related to the code and configuration area of the endpoints. If the received measurements from a particular endpoint do not match expected values, the controller may determine there is a MITM attack and block traffic to the particular endpoint.

As an example for verifying integrity of components within a management component transport protocol (MCTP) server to detect man-in-the-middle (MITM) attacks and preventing data loss upon detection of MITM attacks, in configurations, a controller, e.g., a baseboard management controller (BMC) may authenticate endpoints within a rack server system, e.g., peripheral component interconnect express (PCIe) adapters and/or non-volatile memory express (NVMe) drives. The authentication may occur during or after an endpoint discovery process. The BMC may monitor the endpoints for a response and based at least in part on one of (i) no response being received from an endpoint or (ii) receiving a response from an endpoint and the content of the response, the BMC may block traffic for the endpoint.

In configurations where the monitoring is based at least in part on a request sent by the BMC to one or more endpoints in response to a user action, if the BMC does not receive a response from an endpoint after a predetermined amount of time, the BMC may send another request to the endpoint in response to the user action. In configurations, the predetermined amount of time may be in a range of 3 to 7 seconds. If the BMC does not receive a response from the endpoint, the BMC may block traffic to the endpoint.

Furthermore, in configurations where the monitoring is based at least in part on a request sent by the BMC to one or more endpoints for one or more measurements, the BMC may receive responses from the endpoints, wherein the content of the responses comprise values for the endpoint related to the one or more measurements. The BMC may compare the values related to the one or more measurements with values stored in a table at the BMC. If the values for an endpoint do not match corresponding values stored in the table, the BMC may block traffic for the endpoint.

Thus, in configurations, a method in accordance with techniques described herein may include authenticating, by a controller, an endpoint discovered during an endpoint discovery process within a rack server system. The method may also include monitoring, by the controller, for a response from the endpoint. The method may further include based at least in part on one of (i) no response being received or (ii) receiving the response and content of the response, blocking, by the controller, traffic for the endpoint.

Additionally, in configurations where the monitoring is based at least in part on a first request sent by the controller to the endpoint in response to a user action, the method may further comprise based at least in part on no response to the first request being received after a predetermined amount of time, sending, by the controller, a second request to the endpoint in response to the user action. The blocking, by the controller, traffic for the endpoint may be further based at least in part on no response to the second request being received by the controller.

Furthermore, in configurations where the monitoring is based at least in part on a first request for one or more measurements sent by the controller to the endpoint, the method may further comprise receiving the response from the endpoint, wherein the content of the response comprises values related to the one or more measurements. The method may also further include comparing, by the controller, the values related to the one or more measurements with stored values stored in a table at the controller. The blocking, by the controller, traffic for the endpoint may be further based at least in part on one or more values related to the one or more measurements not matching corresponding stored values stored in the table.

Additionally, the techniques described herein may be performed by a system and/or device having non-transitory computer-readable media storing computer-executable instructions that, when executed by one or more processors, performs the method described above.

Example Embodiments

In configurations, in a rack server system configured as a C-series rack server system, MCTP commands (and/or data) from a BMC are sent to a platform controller hub (PCH), which in turn routes the MCTP commands to the PCIe devices through central processing units (CPUs). The MCTP commands may instruct the PCIe devices to perform one or more actions and/or may request data from the PCIe devices. The BMC sends the MCTP commands to the endpoint, e.g., PCIe device, that performs the required actions or returns data that is requested by BMC. Since the BMC is the trusted device in the rack server system and performs configuration and monitoring functionalities in the rack server system, the data exchanged between the BMC and the endpoint is extremely sensitive data and if hacked/spoofed, may alter the personality of the rack server system and may also likely result in data loss. Thus, there is a need for security between the BMC and endpoints on the MCTP rack server system during MCTP communication. The distributed management task force (DMTF) has defined a Security Protocol and Data Model (SPDM) specification (DSP0274, version 1.1.0) that operates on the MCTP rack server systems. The SPDM specification defines the request command and response command format for the message objects that may be exchanged between the BMC and the endpoints.

In configurations, in order to detect a denial-of-service (DOS) MITM attack, the BMC may perform endpoint authentication according to the SPDM specification (DSP0274). The BMC may cache the root certificate authority (RootCA) and intermediate certificate chain exchanged with endpoints during the authentication procedure. In configurations, the authentication procedure may be performed during an endpoint discovery process performed by the BMC. If the authentication procedure fails with respect to an endpoint, then the BMC may block the MCTP communication to the endpoint, as will be explained further herein.

Additionally, to further authenticate and/or verify the integrity of endpoints, the BMC may check if an expected response is received for any command sent according to a user action. For example, if a user requests to create a virtual drive (VD) on a hard disk drive (HDD), the BMC may send the corresponding commands to an endpoint that is a PCIe device in the form of a storage card and if an expected positive response is received by the BMC from the storage card, then the BMC continues with the process. However, in configurations, during a DOS attack, the BMC does not receive any response as the request sent by BMC will not reach the intended endpoint. If there is a timeout in receiving the response, the BMC may retry the request several times, e.g., 3 to 5 times, with a time gap of, for example, 3 to 7 seconds, e.g., 5 seconds, between the retries. The parameters such as, for example, number of retries and the timing parameters, may be defined based on the system design. If no response is ever received after the predetermined number of retries with respect to an endpoint, then the BMC may block the MCTP communication to the endpoint, as will be explained further herein.

If there is a firmware hang/crash on the PCIe device, the firmware may recover through an internal firmware reboot after some time. During reboot of the PCIe device, the PCIe device may send a "DISCOVERY NOTIFY REQUEST" MCTP command for the BMC to perform partial re-discovery of the PCIe device. On receiving the "DISCOVERY NOTIFY REQUEST" command, the BMC may perform a partial discovery of the PCIe device, restart the endpoint authentication and continue with the further communication. The retries and timings may be adjusted according to system design such that it is greater than the recovery time by the PCIe device during a firmware hung condition. Hence a PCIe device firmware hang/crash scenario may not lead to being considered a false MITM attack.

In configurations, if there is no user action, the BMC may execute GET_MEASUREMENTS commands periodically at a system designed frequency with the endpoints to obtain measurements or attributes related to various parameters, e.g., code and configuration parameters for an endpoint. The BMC may check values within the received responses against expected values, e.g., expected values stored in a table by the BMC. If one or more values in a response from an endpoint does not match with one or more corresponding expected values, the command may be retried according to system design, e.g., 3 to 5 retries spaced in a range of 3 to 7 seconds. If all the retries fail, then it may be determined that there is a MITM attack and the BMC may block MCTP communication with the endpoint.

In particular, the BMC may check the b/d/f values received in a response with an internal f/w measurement index table created during the MCTP endpoint discovery process. The f/w measurement index table may be created as defined in the MCTP specification. The GET_MEASUREMENT commands from the BMC may be sent with a "route-by-id" type. The BMC expects the response from the PCIe device to be in the same format. In an ideal network, the endpoint-ID for a responder endpoint will match with the b/d/f value maintained in the internal f/w measurement index table. If the endpoint-ID fails, then this means that the GET-MEASUREMENTS communication is not occurring with the intended PCIe device. This is considered an MITM attack and the retry of the GET_MEASUREMENTS commands may be done as per a retry mechanism defined by the system, e.g., a number a retries and timing between retries. If the GET_MEASUREMENTS commands fail even after the retries, then the MCTP communication path may be blocked by the BMC as described herein. This process helps detect a specific case of an MITM attack where the attacker can swap the endpoint-IDs of PCIe devices between the PCIe devices present in the system. For example, if a system includes an endpoint in the form of a graphics processing unit (GPU) and an endpoint in the form of a storage card, during MITM attacks if the attacker swaps the endpoint-IDs assigned by the BMC between the GPU and the storage card, then the BMC will still be able to continue the communication, but the commands will not be reaching the intended endpoint. This needs to be avoided to prevent any unwanted system behavior.

If the GET_MEASUREMENTS command fails even after retries, e.g., the received values do not match the expected values, then it may be determined that this is a real MITM attack and the MCTP communication may be blocked to the PCIe device, as further discussed herein. By blocking MCTP communication, it may ensure that no other rogue endpoints/host OS application on the network can send MCTP configuration commands that can reconfigure the PCIe device, which may result in data loss.

In configurations, to detect a spoofing attack, the BMC may use the GET_MEASUREMENTS command to measure firmware measurements of PCIe devices as defined in SPDM specification. This may validate the integrity of the software running on the endpoint (PCIe devices) during runtime. The BMC may execute the GET_MEASUREMENTS command periodically at a defined time frequency according to system design. In configurations, the time interval may be reduced as much as possible according to PCIe device and system design such that the measurements may be done more frequently. In configurations, the firmware measurements check may be defined as mandatory before sending any MCTP command from the BMC to an endpoint.

The GET_MEASUREMENTS response from the endpoint is signed using the private key of the Leaf Certificate maintained securely internally inside the PCIe device. On receiving the response, the BMC may validate the response using the public key extracted from the Leaf Certificate in the intermediate certificate chain that is obtained from the PCIe device during the SPDM endpoint authentication procedure. The intermediate CA certificate chain received may be cached inside the BMC for each of the discovered endpoints. The GET_MEASUREMENTS also has a unique number as a challenge in data payload, and hence the response from the endpoint is unique every time the GET_MEASUREMENTS command is executed.

If the GET_MEASUREMENTS request times out or if the values in the response received from the endpoint are not matching with the expected values, then the BMC may retry the GET_MEASUREMENTS command for 3 to 7 times, e.g., 5 times, with a time gap of 3 to 7 seconds, e.g., 5 seconds. If the GET_MEASUREMENTS command fails for all of the retries, then it may be determined that this is an unsecured endpoint and the MCTP communication path to that PCIe device may be blocked by the BMC as further described herein. This procedure may also validate if the endpoint being addressed by BMC is a valid and intended endpoint or not, which in turn may avoid any spoofing attacks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example of a rack server system 100. In configurations, the rack server system 100 is configured as a C-series MCTP rack server system. MCTP commands (and/or data) from a BMC 102 are sent to a PCH 104, which in turn routes the MCTP commands to endpoints 106, e.g., PCIe devices, through CPUs 108. In the example rack server system 100 there are four examples of endpoints (PCIe devices) 106 illustrated, e.g., a graphics processing unit (GPU), a storage card, a network interface controller (NIC) card, and NVMe drive. In configurations there may be fewer or more endpoints (PCIe devices) 106 and/or there may be fewer or more types of endpoints (PCIe devices) 106. In the example rack server system 100 there are two CPUs, 108a, 108b. In configurations there may be fewer or more CPUs 108. The MCTP commands may instruct the endpoints 106 to perform one or more actions and/or may request data from the endpoints 106. The BMC 102 sends the MCTP commands via PCH 104 to the endpoint 106 that performs the required actions and/or returns data that is requested by the BMC 102. The PCH 104 and CPUs 108 are generally part of a host subsystem 112.

In configurations, the BMC 102 may be coupled to PCH 104 via a PCIe link 114a and an I2c bus-5 114b, which is a dedicated bus as noted below. The PCH 104 may be coupled to the CPUs 110 via a direct media interface (DMI) 114. The CPUs 108a, 108b may be coupled to each other via, for example, an Intel Ultra Path Interconnect (UPI) 116. The CPUs 108a, 108b and PCH 104 may be coupled to the endpoints 106 via a PCIe bus 118. In configurations, the PCIe link 114a may be part of the PCIe bus 118.

Since the BMC 102 is the trusted device in the rack server system 100 and performs configuration and monitoring functionalities in the rack server system 100, the data exchanged between the BMC 102 and the endpoint 106 is extremely sensitive data and if hacked/spoofed, may alter the personality of the rack server system and may also likely result in data loss. As previously noted, the DMTF has defined a SPDM specification (DSP0274, version 1.1.0) that may operate on the rack server systems 100. The SPDM specification defines the request command and response command format for the message objects that may be exchanged between the BMC 102 and the endpoints 106.

In configurations, in order to detect a denial-of-service (DOS) MITM attack, the BMC 102 may perform endpoint authentication according to the SPDM specification (DSP0274). The BMC 102 may cache the root certificate authority (RootCA) and intermediate certificate chain exchanged with endpoints 106 during the authentication procedure. In configurations, the authentication procedure may be performed during an endpoint discovery process performed by the BMC 102. If the authentication procedure fails with respect to a particular endpoint 106, then the BMC 102 may block the MCTP communication to the particular endpoint 106, as will be explained further herein.

Additionally, to further authenticate and/or verify the integrity of endpoints 106, the BMC 102 may check if an expected response is received for any command sent according to a user action. For example, if a user requests to create a virtual drive (VD) on a hard disk drive (HDD), the BMC 102 may send the corresponding commands to an endpoint 106 that is a PCIe device in the form of a storage card and if an expected positive response is received by the BMC 102 from the storage card, then the BMC 102 continues with the process. However, in configurations, during a DOS attack, the BMC 102 does not receive any response as the request sent by BMC 102 will not reach the intended endpoint 106. If there is a timeout in receiving the response, the BMC 102 may retry the request several times, e.g., 3 to 5 times, with a time gap of, for example, 3 to 7 seconds, e.g., 5 seconds, between the retries. The number of retries and the timing parameters may be defined for the rack server system 100 based on the system design. If no response is ever received by the BMC 102 after the predetermined number of retries with respect to the endpoint 106, then the BMC 102 may block the MCTP communication to the endpoint, as will be explained further herein.

If there is a firmware hang/crash on the endpoint 106, the firmware may recover through an internal firmware reboot after some time. During reboot of the endpoint 106, the endpoint 106 may send a "DISCOVERY NOTIFY REQUEST" MCTP command for the BMC 102 to perform partial re-discovery of the endpoint 106. On receiving the "DISCOVERY NOTIFY REQUEST" command, the BMC 102 may perform a partial discovery of the endpoint 106, restart the endpoint authentication and continue with the further communication. The retries and timings may be adjusted according to system design such that it is greater than the recovery time by the endpoint 106 during a firmware hung condition. Hence a PCIe device firmware hang/crash scenario may not lead to being considered a false MITM attack.

In configurations, if there is no user action, the BMC 102 may execute GET_MEASUREMENTS commands periodically at a system designed frequency with the endpoints 106 to obtain measurements or attributes related to various parameters, e.g., code and configuration parameters for an endpoint. The BMC 102 may check values within the received responses against expected values, e.g., expected values stored in an internal f/w measurement index table 110 by the BMC 102. If one or more values in a response from a particular endpoint 106 does not match with one or more corresponding expected values in the f/w measurement index table 110, the command may be retried according to system design, e.g., 3 to 5 retries spaced in a range of 3 to 7 seconds. If all the retries fail, then it may be determined that there is a MITM attack and the BMC 102 may block MCTP communication with the particular endpoint 106.

In particular, the BMC 102 may check the b/d/f values received in a response with the f/w measurement index table 110, which may be created during the MCTP endpoint discovery process. The f/w measurement index table 110 may be created as defined in the MCTP specification. The GET_MEASUREMENT commands from the BMC 102 may be sent with a "route-by-id" type. The BMC 102 expects the response from the endpoint 106 to be in the same format. In an ideal network, the endpoint-ID for a responder endpoint 106 will match with the b/d/f value maintained in the internal f/w measurement index table 110. If the endpoint-ID verification fails, then this means that the GET-MEASUREMENTS communication is not occurring with the intended endpoint 106. This is considered an MITM attack and the retry of the GET_MEASUREMENTS commands may be done as per a retry mechanism defined by the system, e.g., a number a retries and timing between retries. If the GET_MEASUREMENTS commands fail even after the retries, then the MCTP communication path may be blocked by the BMC 102 as described herein. This process helps detect a specific case of an MITM attack where the attacker can swap the endpoint-IDs of endpoints 106 between the endpoints 106 present in the rack server system 100. For example, if the rack server system 100 includes endpoints 106 in the form of a graphics processing unit (GPU) and a storage card, during MITM attacks if the attacker swaps the endpoint-IDs assigned by the BMC 102 between the GPU and the storage card, then the BMC 102 will still be able to continue the communication, but the commands will not be reaching the intended endpoint 106. This needs to be avoided to prevent any unwanted system behavior.

If the GET_MEASUREMENTS command fails even after retries, e.g., the received values do not match the expected values, then it may be determined that this is a real MITM attack and the MCTP communication path may be blocked to the endpoint 106, as further discussed herein. By blocking MCTP communication, it may ensure that no other rogue endpoints/host OS applications on the rack server system 100 can send MCTP configuration commands that can reconfigure the endpoint 106, which may result in data loss.

In configurations, to detect a spoofing attack, the BMC 102 may use the GET_MEASUREMENTS command to measure firmware measurements of endpoints 106 as defined in SPDM specification. This may validate the integrity of the software running on the endpoints 106 during runtime. The BMC 102 may execute the GET_MEASUREMENTS command periodically at a defined time frequency according to system design. In configurations, the time interval may be reduced as much as possible according to endpoint 106 and rack server system 100 design such that the measurements may be done more frequently. In configurations, the firmware measurements check may be defined as mandatory before sending any MCTP command from the BMC 102 to an endpoint 106.

The GET_MEASUREMENTS response from the endpoint 106 is signed using the private key of the Leaf Certificate maintained securely internally inside the endpoint 106. On receiving the response, the BMC 102 may validate the response using the public key extracted from the Leaf Certificate in the intermediate certificate chain that is obtained from the endpoint 106 during the SPDM endpoint authentication procedure. The intermediate CA certificate chain received may be cached inside the BMC 102 for each of the discovered endpoints 106. The GET_MEASUREMENTS also has a unique number as a challenge in data payload, and hence the response from the endpoint 106 is unique every time the GET_MEASUREMENTS command is executed.

If the GET_MEASUREMENTS request times out or if the values in the response received from the endpoint 106 are not matching with the expected values, then the BMC 102 may retry the GET_MEASUREMENTS command for 3 to 7 times, e.g., 5 times, with a time gap of 3 to 7 seconds, e.g., 5 seconds. If the GET_MEASUREMENTS command fails for all of the retries, then it may be determined that this is an unsecured endpoint 106 and the MCTP communication path to that endpoint 106 may be blocked by the BMC 102 as further described herein. This procedure may also validate if the endpoint being addressed by BMC 102 is a valid and intended endpoint or not, which in turn may avoid any spoofing attacks.

FIG. 2A illustrates an example of a GET_MEASUREMENTS request message format 200, while FIGS. 2B and 2C illustrate a GET_MEASUREMENTS response message format 202. The example GET_MEASUREMENTS request message format 200 and the example GET_MEASUREMENTS response message format 202 are generally in accordance with the MCTP SPDM transport protocol.

Figure 3:
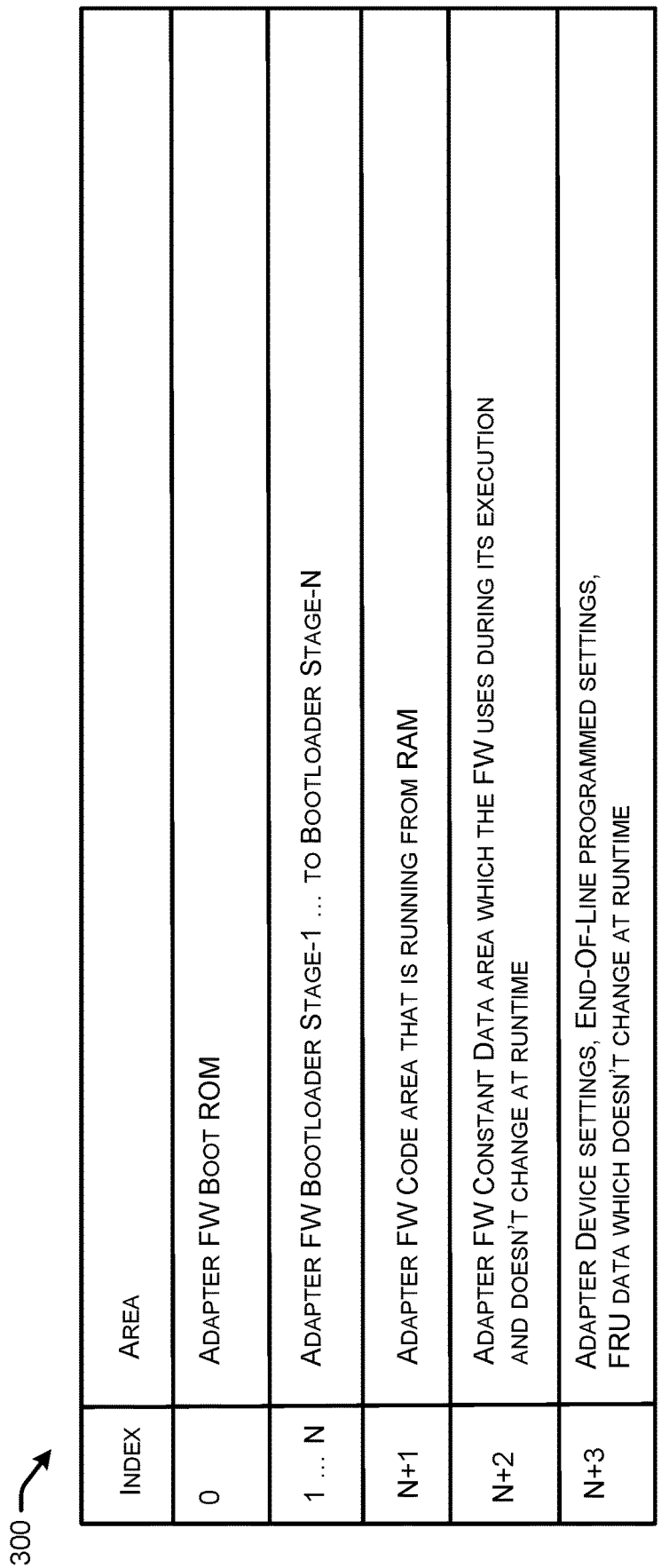
FIG. 3 illustrates an example of a GET_MEASUREMENTS index table indicating the code and configuration areas (config areas) that may be measured on the firmware of PCIe endpoints of FIG. 1 with examples of areas of the code and configuration area of endpoints that may be periodically measured, in accordance with the MCTP SPDM protocol.

FIG. 3 illustrates an example of a GET_MEASUREMENTS index table 300 indicating the code/config areas that may be measured on the firmware of PCIe endpoints 106 that may be periodically measured, in accordance with the MCTP protocol. The measurement indices of FIG. 3 help ensure a valid and intended firmware is running on an endpoint 106. The BMC 102 may receive a database file that contains the expected measurement values for the measurement indices of the GET_MEASUREMENTS index table 300 specific to each endpoint 106 supported in the rack server system 100 for the supported adapter firmware version. The database file contains only the expected GET_MEASUREMENT values for each PCIe device (endpoint 106) and for each firmware version running on the PCIe device. This is static data and will not change at runtime from system to system. The b/d/f values can always change at runtime from system to system. The b/d/f value is a hardware value that gets assigned from CPUs present on the system. The BMC 102 may create the f/w measurement table 110 with mapping: b/d/f value to a 4-part identification to an Expected GET_MEASUREMENT Response. The BMC 102 may compare the expected measurement values present in the f/w measurement table 110 against the GET_MEASUREMENTS response received from the endpoints 106. An option from user interfaces (webUI/CLI/XMLAPI) may be provided to update the f/w measurement index table 110 to support the endpoint firmware updates in the field. The database file may be signed and encrypted. The BMC 102 may always accept signed and encrypted files to cater to the security conditions. In configurations, the GET_MEASUREMENTS index table 300 may be extended according to the firmware area indices supported by the endpoints 106. An example of a sample database file (in JSON) may be as follows:

```
{
  "pcie_adapters": [
    {
      "vendor_id": 0xAABB,
      "device_id": 0xAABB,
      "sub_vendor_id": 0xAABB,
      "sub_device_id": 0xAABB,
      "fw_version": "1.21",
      "fw_meas": {
        {
          "slot_id": "0",
          "meas_data": "0xAABB"
        },
        {
          "slot_id": "1",
          "meas_data": "0xAABB"
        },
        {
          "slot_id": "2",
          "meas_data": "0xAABB"
        }
      }
    },
    {
      <next adapter info in same format>
    }
  ]
}
```

When a MITM attack is detected, in configurations the BMC 102 sends an intelligent platform management bus (IPMB) command with the affected endpoint's b/d/f details to block the MCTP traffic for the affected endpoint 106. A new IPMB original equipment (OEM) command is defined for the affected endpoint 106. Since the BMC 102 to ME IPMB communication is over SMBUS, there will not be any device on the rack server system 100 that can trigger IPMB commands. This channel provides a hardware security channel through point-to-point communication. The b/d/f details that are sent from the BMC 102 may be transferred to a CPU 108 through the in-band DMI interface 114 that sets the required register settings to block the MCTP traffic for the affected endpoint 106. The register to block the MCTP traffic may be exposed only through an ME sideband interface and may not be changed by any application/driver running on the operating system (OS). As previously noted with respect to FIG. 1, an I2c bus-5 112 is a dedicated bus 114b for IPMB communication between the BMC 102 and the PCH 104. Since this is a point-to-point hardwired interface, the bus cannot be accessed by any other device on the rack server system 100.

Figure 4A:
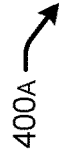
FIG. 4A illustrates an example of an IPMB request format to block the MCTP communication for an endpoint in the rack server system of FIG. 1.

FIG. 4A illustrates an example of an IPMB request format 400a to block the MCTP communication for an endpoint 106 in the rack server system 100. FIG. 4A illustrates an example of an IPMB request format 400b to obtain the current status of the MCTP communication path for an endpoint 106 in the rack server system 100.

In configurations, there are certain conditions that may need to be considered. For example, as is known, in C-series rack servers, only NVMe drives are hot pluggable. In configurations, for a PCIe hot plug event for NVMe drives, general-purpose input/output (GPIO)/field-programmable array (FPGA) registers are included in the BMC 102 to detect a hot plug event. This information may be leveraged to avoid false positives during a DoS attack. For a PCIe adapter device hang, the timing and retry parameters, as previously mentioned, may be fine-tuned as per system design. However, if the PCIe device is still in a hung state/unresponsive, there may be more catastrophic error such as, for example, a CATERR resulting a host reboot. For a default state, whenever a host reboot event occurs, all MCTP paths are set to their default(enabled) state irrespective of their previous state.

Figure 5A:
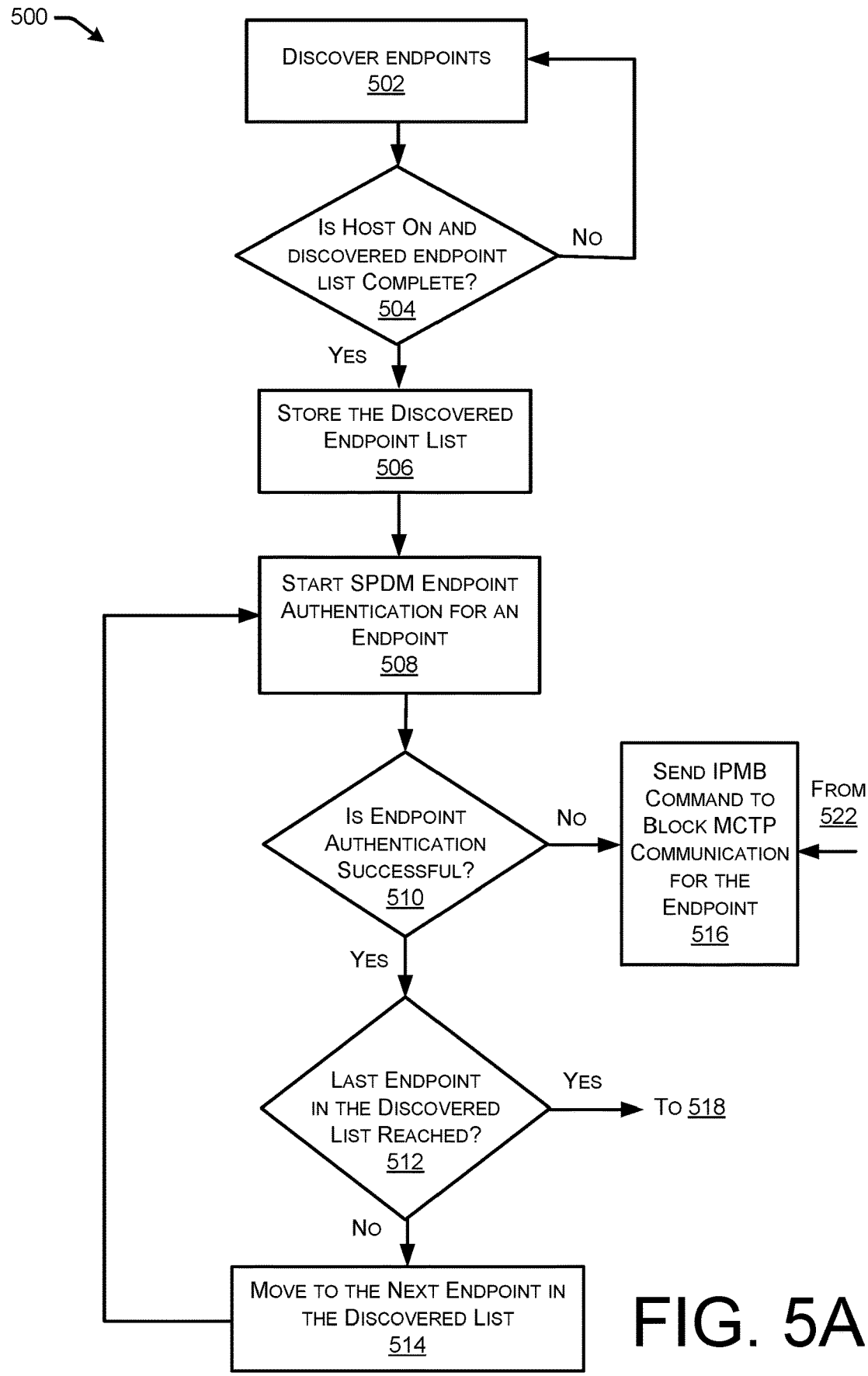
FIGS. 5A and 5B illustrate a flow diagram of an example method for detecting and preventing an MITM attack within the rack server system of FIG. 1
Figure 5B:
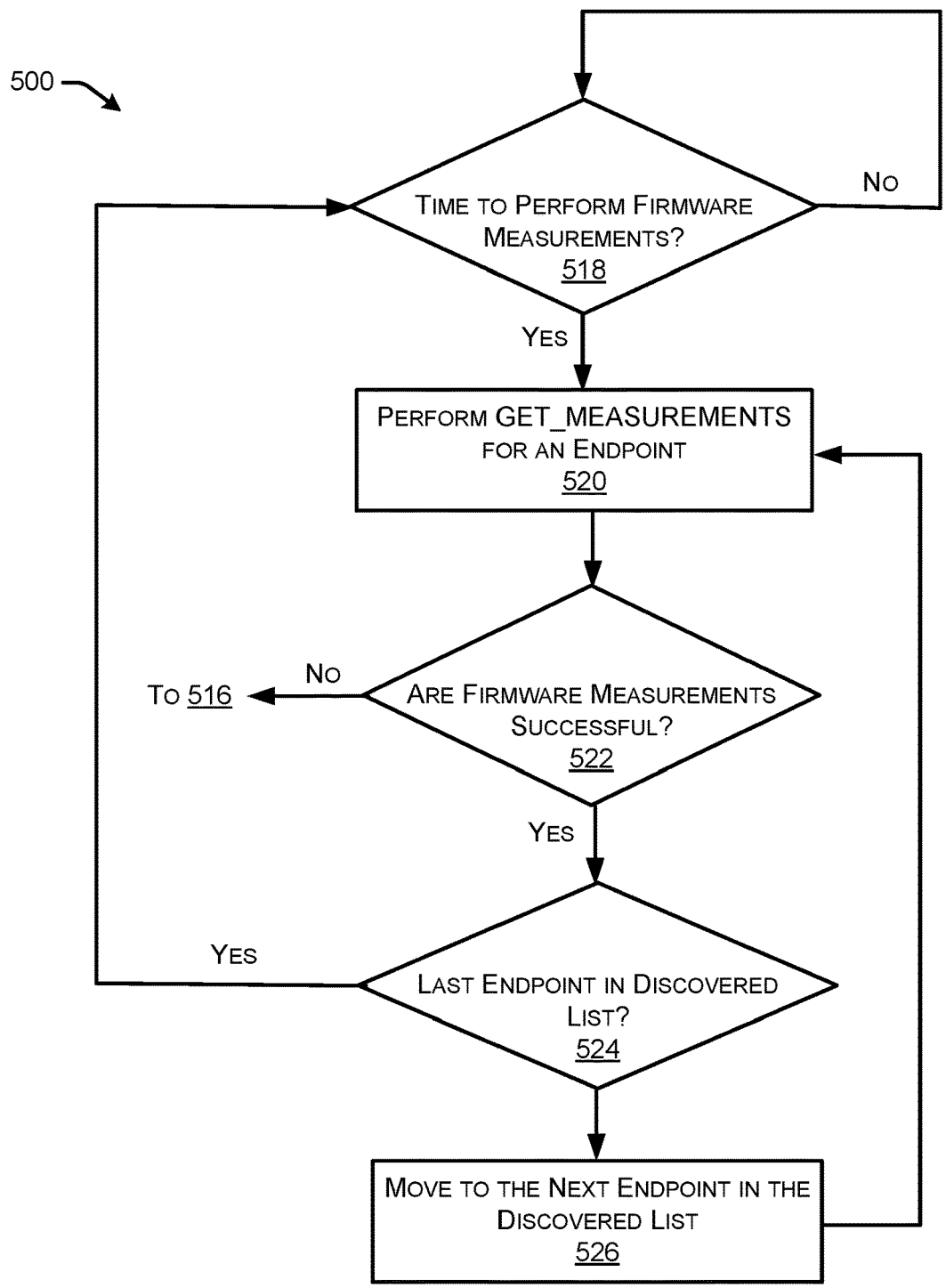
Figure 6:
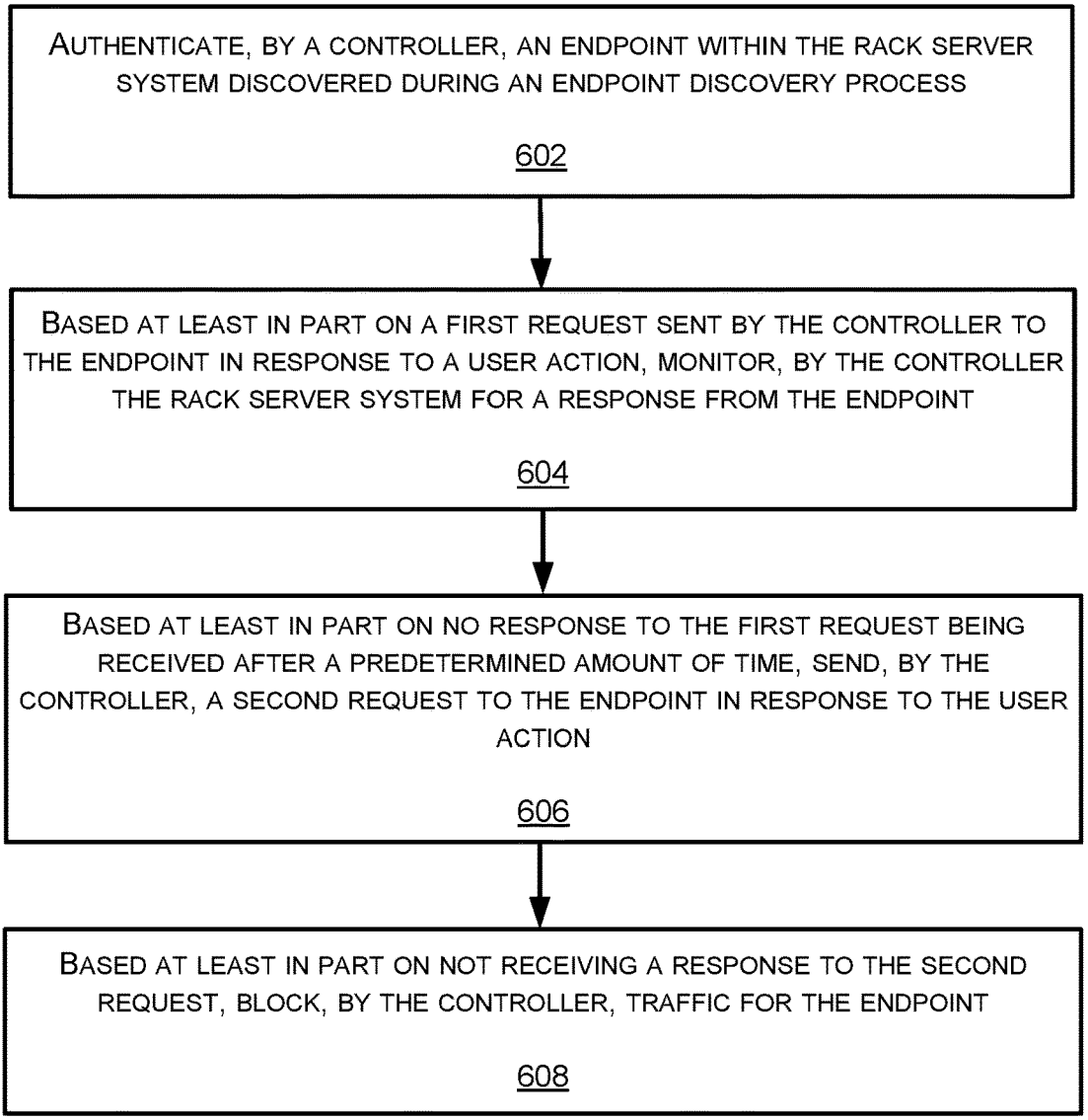
FIGS. 6 and 7 illustrate flow diagrams of example methods for verifying integrity of components within the rack server system of FIG. 1.
Figure 7:
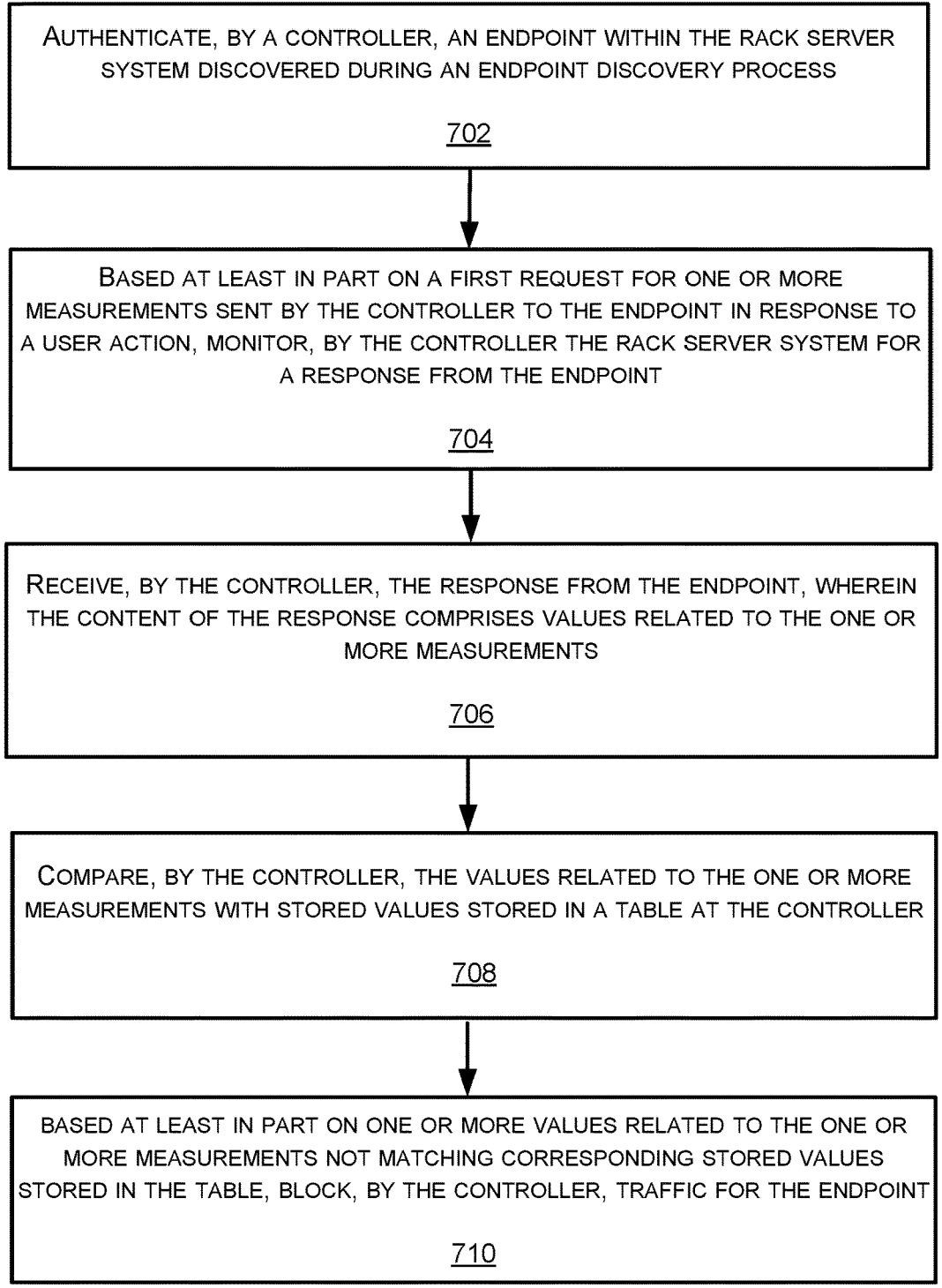

FIGS. 5-7 illustrate flow diagrams of example methods 500, 600, and 700, respectively, that illustrate aspects of the functions performed at least partly by the BMC 102 as described in FIGS. 1-4. The logical operations described herein with respect to FIGS. 5-7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIGS. 5-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 5A and 5B illustrate a flow diagram of an example method 500 for detecting and preventing an MITM attack within a rack server system, e.g., the rack server system 100 configured as a management component transport protocol (MCTP) server system. In some examples, the techniques of method 400 may be performed by a controller, e.g., BMC 102. In such examples, the controller may comprise one or more hardware interfaces configured to send and receive commands and/or packets of data in the rack server system 100, one or more processors, and one or more non-transitory computer-readable media storing computer-executable instructions that, when executed by the one or more processors, cause the one or more processors to perform steps of method 500.

At 502, an endpoint discovery process is performed. For example, the BMC 102 may perform an endpoint discovery process to discover endpoints, e.g., PCIe devices, 106 in the rack server system 100.

At 504, it is determined if the host is on and the discovered endpoint list is complete. For example, the BMC 102 may determine if the PCH 104 is on and that the discovered endpoint list is complete. If not, then the method 500 returns to 502. If the PCH 104 is on and the discovered endpoint list is complete, then the method 500 continues to block 506.

At block 506, the discovered endpoint list is stored. For example, the BMC 102 may store the discovered endpoint list, along with b/d/f values, in the internal f/w measurement index table 110.

At block 508, an SPDM endpoint authentication procedure for an endpoint is started. For example, the BMC 102 may authenticate and/or verify integrity of endpoints 106 on the discovered endpoint list.

At block 510, it is determined if the authentication procedure for the endpoint is successful. For example, the BMC 102 may send a request for a service to the endpoint 106 based on a user input. If the BMC 102 receives an appropriate response from the endpoint 106, then the method 500 proceeds to block 512. If no response is received, then the endpoint authentication procedure is not successful and the method 500 proceeds to block 516, where the BMC 102 may send an IPMB command to block MCTP communication for the affected endpoint 106.

At block 512, it is determined if the last endpoint in the discovered endpoint list has been reached. For example, the BMC 102 may determine that there are further endpoints 106 in the discovered endpoint list to be authenticated. If the last endpoint in the discovered endpoint list has not been authenticated, then the method 500 proceeds to block 514, where the BMC 102 moves to the next endpoint 106 in the discovered endpoint list and the method 500 returns to block 508 for the next endpoint 106.

If at block 512 the last endpoint 106 in the discovered endpoint list has been authenticated, then the method 500 proceeds to block 518 in FIG. 5B. It is to be noted that in configurations one or more elements of the authentication procedure may be performed simultaneously with the endpoint discovery process.

At block 518, it is determined if it is time to perform firmware measurements with respect to endpoints on the discovered endpoint list. If not, the BMC 102 waits. If it is time, e.g., a predetermined amount of time has passed, the method 500 may proceed to block 520.

At block 520, GET_MEASUREMENTS for an endpoint is performed. For example, the BMC 102 may send a GET_MEASUREMENTS request to an endpoint 106 and receives a GET_MEASUREMENTS response from the endpoint.

At block 522, it is determined if the firmware measurements for the endpoint were successful. For example, the BMC 102 may compare b/d/f values in the GET_MEASUREMENTS response match b/d/f values in the internal f/w measurement index table 110 for the endpoint 106. If the firmware measurements for the endpoint 106 were not successful, e.g., the b/d/f values do not match, then the method 500 proceeds to block 516 of FIG. 5A, where the BMC 102 may send an IPMB command to block MCTP communication for the affected endpoint 106. If the firmware measurements for the endpoint 106 were successful, e.g., the b/d/f values do match, then the method 500 proceeds to block 524.

At block 524, it is determined if the last endpoint in the discovered endpoint list has been reached. For example, the BMC 102 may determine that there are further endpoints 106 in the discovered endpoint list to be further authenticated and/or have their integrity verified. If the last endpoint in the discovered endpoint list has not been further authenticated and/or had its integrity verified, then the method 500 proceeds to block 526, where the BMC 102 moves to the next endpoint 106 in the discovered endpoint list and the method 500 returns to block 520 for the next endpoint 106. If at block 524 the last endpoint 106 has been reached, then the method 500 returns to block 518 to start firmware measurements again after a predetermined amount of time.

FIG. 6 illustrates a flow diagram of an example method 600 for verifying integrity of components, e.g., endpoints 106 in the form of PCIe devices, within a management component transport protocol (MCTP) server system, e.g., rack server system 100, to detect man-in-the-middle (MITM) attacks. In some examples, the techniques of method 400 may be performed by a controller, e.g., BMC 102. In such examples, the controller may comprise one or more hardware interfaces configured to send and receive commands and/or packets of data in the rack server system 100, one or more processors, and one or more non-transitory computer-readable media storing computer-executable instructions that, when executed by the one or more processors, cause the one or more processors to perform steps of method 600.

At 602, the controller may authenticate an endpoint within the rack server system discovered during an endpoint discovery process. For example, the BMC 102 may authenticate endpoints 106 discovered during an endpoint discovery process according to the SPDM specification (DSP0274).

At 604, based at least in part on a first request sent by the controller to the endpoint in response to a user action, the controller may monitor the rack server system for a response from the endpoint. For example, the BMC 102 may, based on a user input, request a service from the endpoint 106. The BMC 102 may monitor the rack server system 100 for a response to the request.

At 606, based at least in part on no response to the first request being received after a predetermined amount of time, the controller may send a second request to the endpoint in response to the user action. For example, after a predetermined amount of time of waiting for a response, the BMC 102 may send a second request to the endpoint 106 for the service.

At 608, based at least in part on not receiving a response to the second request, the controller may block traffic for the endpoint. For example, the BMC 102 may send an intelligent platform management bus (IPMB) command with the affected endpoint's b/d/f details to block the MCTP traffic for the affected endpoint. A new IPMB original equipment manufacturer (OEM) command is defined for the affected endpoint 106. The b/d/f details that are sent from the BMC 102 may be transferred to a CPU 108 through the in-band DMI interface 116 that sets the required register settings to block the MCTP traffic for the affected endpoint 106. The register to block the MCTP traffic may be exposed only through an ME sideband interface and may not be changed by any application/driver running on the operating system (OS).

FIG. 7 illustrates a flow diagram of another example method 700 for verifying integrity of components, e.g., endpoints 106 in the form of PCIe devices, within a management component transport protocol (MCTP) server system, e.g., rack server system 100, to detect man-in-the-middle (MITM) attacks. In some examples, the techniques of method 400 may be performed by a controller, e.g., BMC 102. In such examples, the controller may comprise one or more hardware interfaces configured to send and receive commands and/or packets of data in the rack server system 100, one or more processors, and one or more non-transitory computer-readable media storing computer-executable instructions that, when executed by the one or more processors, cause the one or more processors to perform steps of method 700.

At 702, the controller may authenticate an endpoint within the rack server system discovered during an endpoint discovery process. For example, the BMC 102 may authenticate endpoints 106 discovered during an endpoint discovery process according to the SPDM specification (DSP0274).

At 704, based at least in part on a first request for one or more measurements sent by the controller to the endpoint, the controller may monitor the rack server system for a response from the endpoint. For example, the BMC 102 may send a GET_MEASUREMENTS request message to the endpoint 106. The BMC 102 may monitor the rack server system 100 for a GET_MEASUREMENTS response message from the endpoint 106.

At 706, the controller may receive the response from the endpoint, wherein the content of the response comprises values related to the one or more measurements. For example, the BMC 102 may monitor the rack server system 100 for a GET_MEASUREMENTS response message from the endpoint 106.

At 708, the controller may compare the values related to the one or more measurements with stored values stored in a table at the controller. For example, the BMC 102 may compare the received values related to the one or more measurements, e.g., b/d/f values, with stored values, e.g., b/d/f values, stored in the table 110 at the BMC 102.

At 710, based at least in part on one or more values related to the one or more measurements not matching corresponding stored values stored in the table, the controller may block traffic for the endpoint. For example, the BMC 102 may send an intelligent platform management bus (IPMB) command with the affected endpoint's b/d/f details to block the MCTP traffic for the affected endpoint. A new IPMB original equipment (OEM) command is defined for the affected endpoint 106. The b/d/f details that are sent from the BMC 102 may be transferred to a CPU 108 through the in-band DMI interface 114 that sets the required register settings to block the MCTP traffic for the affected endpoint 106. The register to block the MCTP traffic may be exposed only through an ME sideband interface and may not be changed by any application/driver running on the operating system (OS).

Figure 8:
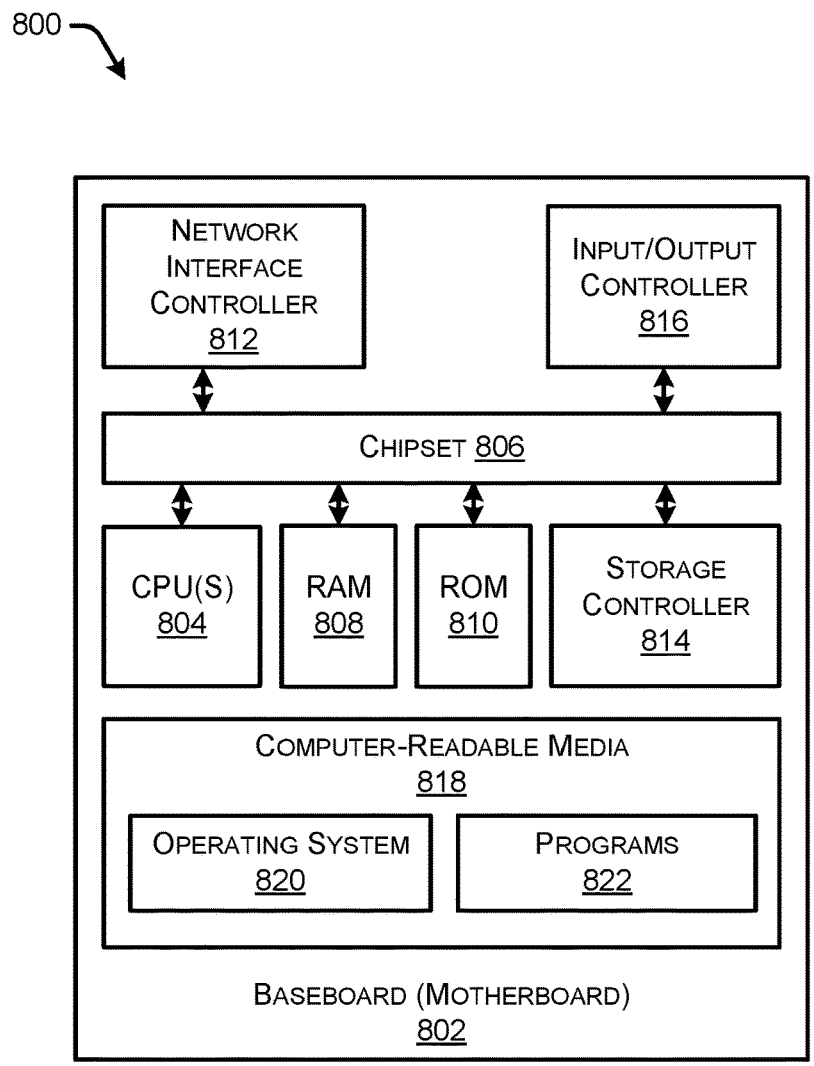
FIG. 8 is a computer architecture diagram showing an illustrative computer hardware architecture for implementing one or more elements of a rack server system that can be utilized to implement aspects of the various technologies presented herein.

FIG. 8 shows an example computer architecture for a computer 800 capable of executing program components for implementing the functionality described above. One or more computers 800 shown in FIG. 8 may be used to implement one or more elements of the example rack server system 100 system described herein, and may comprise a conventional server computer, workstation, desktop computer, laptop, tablet, network appliance, e-reader, smartphone, or other computing device, and can be utilized to execute any of the software components presented herein. In some examples, however, the computer 800 may correspond to networked devices such as servers, switches, routers, hubs, bridges, gateways, modems, repeaters, access points, etc., and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800. The CPUs 804 may, in configurations, correspond to CPUs 110.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 102. The chipset 806 can include functionality for providing network connectivity through a NIC 812, such as a gigabit Ethernet adapter. The NIC 812 is capable of connecting the computer 800 to other computing devices over the portion 102. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the rack server system 100, and or any components included therein, may be supported by one or more devices similar to computer 800. Stated otherwise, some or all of the operations performed by the rack server system 100, and or any components included therein, may be performed by one or more computer devices 802 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The programs 822 may comprise any type of programs or processes to perform the techniques described in this disclosure for verifying the integrity of the endpoints 106, e.g., PCIe devices, of the rack server system 100. Generally, the programs 822 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
    authenticating, by a controller, an endpoint discovered during a management component transport protocol (MCTP) endpoint discovery process within a rack server system;
    based at least in part on a first request for one or more measurements sent by the controller to the endpoint, monitoring, the rack server system by the controller, for a response to the first request from the endpoint, wherein the one or more measurements relate to code and configuration parameters for the endpoint;
    receiving the response from the endpoint, wherein content of the response comprises values related to the one or more measurements;
    comparing, by the controller, the values related to the one or more measurements with stored values stored in a measurement index table at the controller, wherein the measurement index table is created during the MCTP endpoint discovery process; and
    based at least in part on one or more values related to the one or more measurements not matching corresponding stored values stored in the measurement index table, blocking, by the controller, a communication path for the endpoint.

2. The computer-implemented method of claim 1, further comprising:
    generating, by the controller, the measurement index table during the MCTP endpoint discovery process.

3. The computer-implemented method of claim 1, wherein the response is a first response, the one or more values are one or more first values, and the method further comprises:
    based at least in part on the one or more first values related to the one or more measurements not matching corresponding stored values stored in the measurement index table, sending, by the controller, a second request to the endpoint for the one or more measurements after a predetermined amount of time;
    receiving a second response from the endpoint, wherein content of the second response comprises second values related to the one or more measurements; and
    comparing, by the controller, the second values related to the one or more measurements with the stored values stored in the measurement index table,
    wherein the blocking, by the controller, the communication path for the endpoint is based at least in part on one or more second values related to the one or more measurements not matching corresponding stored values stored in the measurement index table.

4. The computer-implemented method of claim 3, wherein the predetermined amount of time is in a range of 3 to 7 seconds.

5. The computer-implemented method of claim 3, further comprising:
    based at least in part on the one or more second values related to the one or more measurements not matching corresponding stored values stored in the measurement index table, sending, by the controller, a third request to the endpoint for the one or more measurements after the predetermined amount of time;
    receiving a third response from the endpoint, wherein content of the third response comprises third values related to the one or more measurements; and
    comparing, by the controller, the third values related to the one or more measurements with the stored values stored in the measurement index table,
    wherein the blocking, by the controller, the communication path for the endpoint is based at least in part on one or more third values related to the one or more measurements not matching corresponding stored values stored in the measurement index table.

6. One or more non-transitory computer-readable media storing computer-executable instructions that, when executed by one or more processors, cause the one or more processors to perform actions comprising:
    authenticating, by a controller, an endpoint discovered during a management component transport protocol (MCTP) endpoint discovery process within a rack server system;
    based at least in part on a first request for one or more measurements sent by the controller to the endpoint, monitoring, the rack server system by the controller, for a response to the first request from the endpoint, wherein the one or more measurements relate to code and configuration parameters for the endpoint;
    receiving the response from the endpoint, wherein content of the response comprises values related to the one or more measurements;
    comparing, by the controller, the values related to the one or more measurements with stored values stored in a measurement index table at the controller, wherein the measurement index table is created during the MCTP endpoint discovery process; and based at least in part on one or more values related to the one or more measurements not matching corresponding stored values stored in the measurement index table, blocking, by the controller, a communication path for the endpoint.

7. The one or more non-transitory computer-readable media of claim 6, wherein the actions further comprise:
generating the measurement index table during the endpoint discovery process.

8. The one or more non-transitory computer-readable media of claim 6, wherein the response is a first response, the one or more values are one or more first values, and the actions further comprise:
based at least in part on the one or more first values related to the one or more measurements not matching corresponding stored values stored in the measurement index table, sending a second request to the endpoint for the one or more measurements after a predetermined amount of time;
receiving a second response from the endpoint, wherein content of the second response comprises second values related to the one or more measurements; and
comparing the second values related to the one or more measurements with the stored values stored in the measurement index table,
wherein the blocking the communication path for the endpoint is based at least in part on one or more second values related to the one or more measurements not matching corresponding stored values stored in the measurement index table.

9. The one or more non-transitory computer-readable media of claim 8, wherein the predetermined amount of time is in a range of 3 to 7 seconds.

10. The one or more non-transitory computer-readable media of claim 8, wherein the actions further comprise:
based at least in part on the one or more second values related to the one or more measurements not matching corresponding stored values stored in the measurement index table, sending a third request to the endpoint for the one or more measurements after the predetermined amount of time;
receiving a third response from the endpoint, wherein content of the third response comprises third values related to the one or more measurements; and
comparing the third values related to the one or more measurements with the stored values stored in the measurement index table,
wherein the blocking the communication path for the endpoint is based at least in part on one or more third values related to the one or more measurements not matching corresponding stored values stored in the measurement index table.

11. A system comprising:
one or more processors; and
one or more non-transitory computer-readable media storing computer-executable instructions that, when executed by the one or more processors, cause the one or more processors to perform actions comprising:
authenticating, by a controller, an endpoint discovered during a management component transport protocol (MCTP) endpoint discovery process within a rack server system;
based at least in part on a first request for one or more measurements sent by the controller to the endpoint, monitoring, the rack server system by the controller, for a response to the first request from the endpoint, wherein the one or more measurements relate to code and configuration parameters for the endpoint;
receiving the response from the endpoint, wherein content of the response comprises values related to the one or more measurements;
comparing, by the controller, the values related to the one or more measurements with stored values stored in a measurement index table at the controller, wherein the measurement index table is created during the MCTP endpoint discovery process; and
based at least in part on one or more values related to the one or more measurements not matching corresponding stored values stored in the measurement index table, blocking, by the controller, a communication path for the endpoint.

12. The system of claim 11, wherein the actions further comprise:
generating the measurement index table during the endpoint discovery process.

13. The system of claim 11, wherein the response is a first response, the one or more values are one or more first values, and the actions further comprise:
based at least in part on the one or more first values related to the one or more measurements not matching corresponding stored values stored in the measurement index table, sending a second request to the endpoint for the one or more measurements after a predetermined amount of time;
receiving a second response from the endpoint, wherein content of the second response comprises second values related to the one or more measurements; and
comparing the second values related to the one or more measurements with the stored values stored in the measurement index table,
wherein the blocking the communication path for the endpoint is based at least in part on one or more second values related to the one or more measurements not matching corresponding stored values stored in the measurement index table.

14. The system of claim 13, wherein the predetermined amount of time is in a range of 3 to 7 seconds.

15. The system of claim 13, wherein the actions further comprise:
based at least in part on the one or more second values related to the one or more measurements not matching corresponding stored values stored in the measurement index table, sending a third request to the endpoint for the one or more measurements after the predetermined amount of time;
receiving a third response from the endpoint, wherein content of the third response comprises third values related to the one or more measurements; and
comparing the third values related to the one or more measurements with the stored values stored in the measurement index table,
wherein the blocking the communication path for the endpoint is based at least in part on one or more third values related to the one or more measurements not matching corresponding stored values stored in the measurement index table.

* * * * *